(12) United States Patent
Potente

(10) Patent No.: US 6,378,459 B1
(45) Date of Patent: Apr. 30, 2002

(54) METHOD OF DETERRING CLIMBING ANIMALS FROM ACCESSING ELEVATED BIRD FEEDERS, NESTING BOXES AND PLANTS

(76) Inventor: John Potente, 659 Wheeler Rd., Hauppauge, NY (US) 11788

( * ) Notice: Subject to any disclaimer, the term of this patent is extended or adjusted under 35 U.S.C. 154(b) by 0 days.

(21) Appl. No.: 09/490,397

(22) Filed: Jan. 24, 2000

Related U.S. Application Data

(63) Continuation-in-part of application No. 09/067,884, filed on Apr. 28, 1998, now Pat. No. 6,024,048.

(51) Int. Cl.[7] .................. A01K 39/00; A01G 13/10; E04B 1/72
(52) U.S. Cl. ............... 119/57.9; 119/52.3; 119/428; 119/429; 47/30; 52/101
(58) Field of Search .............. 119/57.9, 52.3, 119/59, 428, 429; 52/101; 47/23, 24, 25, 30, 47, 44, 46

(56) References Cited

U.S. PATENT DOCUMENTS

| | | | | |
|---|---|---|---|---|
| 574,998 A | * | 1/1897 | Kent | 47/23 |
| 3,362,115 A | * | 1/1968 | Nyhus et al. | 52/101 |
| 4,031,856 A | * | 6/1977 | Chester | 119/57.9 |
| 4,259,927 A | * | 4/1981 | Clarke | 119/57.9 |
| 4,765,277 A | * | 8/1988 | Bailey et al. | 119/57.9 |
| 5,003,734 A | * | 4/1991 | Dinsmore | 52/101 |
| 5,291,855 A | * | 3/1994 | Laverty | 119/52.3 |
| 5,295,455 A | * | 3/1994 | Johnson | 119/57.9 |
| 5,347,750 A | * | 9/1994 | Mills | 47/30 |
| 5,355,835 A | * | 10/1994 | Freed | 119/57.9 |
| 5,375,368 A | * | 12/1994 | Motz, Jr. | 47/30 |
| 5,394,641 A | * | 3/1995 | Danca | 43/124 |
| 5,493,997 A | * | 2/1996 | Ritchey | 119/428 |
| 5,581,935 A | * | 12/1996 | Anderson | 47/23 |
| 5,878,537 A | * | 3/1999 | Flischel | 52/101 |
| 6,029,607 A | * | 2/2000 | Smigelski | 119/428 |
| 6,125,595 A | * | 10/2000 | Showalter | 52/101 |
| 6,138,404 A | * | 10/2000 | King et al. | 47/30 |
| 6,260,512 B1 | * | 7/2001 | Newman | 119/433 |

\* cited by examiner

Primary Examiner—Charles T. Jordan
Assistant Examiner—John W. Zerr
(74) Attorney, Agent, or Firm—Alfred M. Walker

(57) ABSTRACT

A method for deterring arboreal animals from climbing and reaching a bird feeder nesting box or elevated plant holder, supported atop a post set within the ground, includes the steps of providing a freestanding, non-rotatable hollow, longitudinally extending body and inserting the post supporting the bird feeder, nesting box or elevated plant holder conjunctionally therein. Alternatively, the bird feeder, nesting box or elevated plant holder may be directly supported atop the freestanding, non-rotatable, longitudinally extending body. The free standing, non-rotatable longitudinally extending body extends up from the ground, and is made of a minimal height and width, whereupon the arboreal animal will slide down the free standing, non-rotatable hollow, longitudinally extending body to a position where the arboreal animal is out of a jumping range to reach said bird feeder, nesting box or elevated plant.

7 Claims, 3 Drawing Sheets

FIG. 1
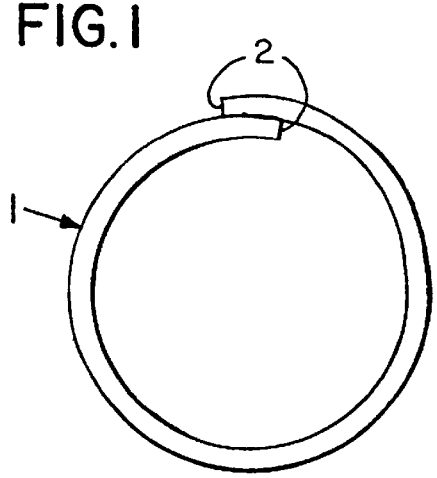
FIG. 2
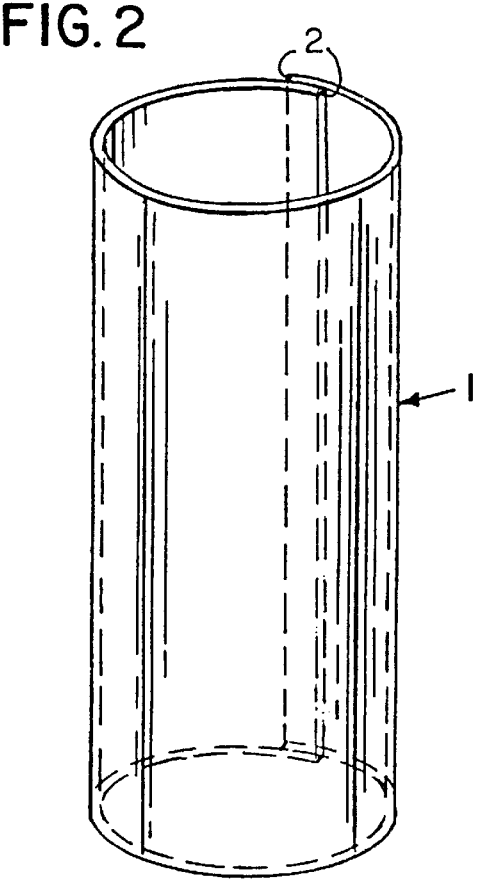
FIG. 3
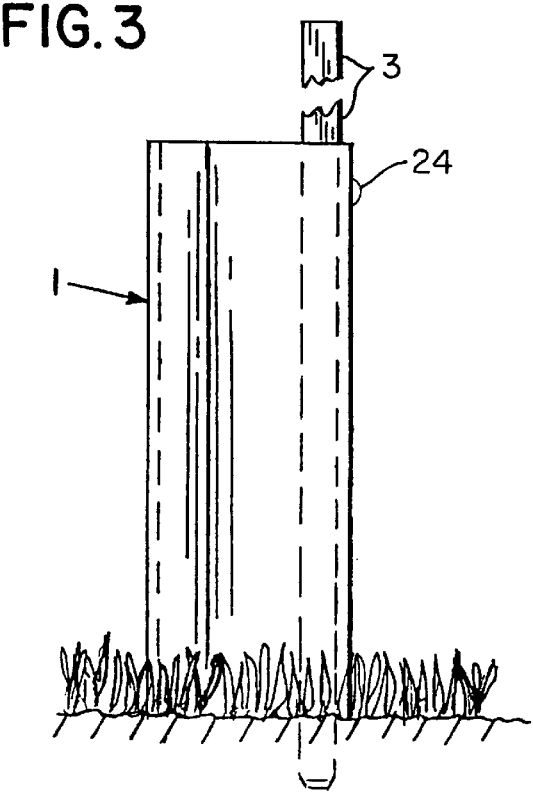
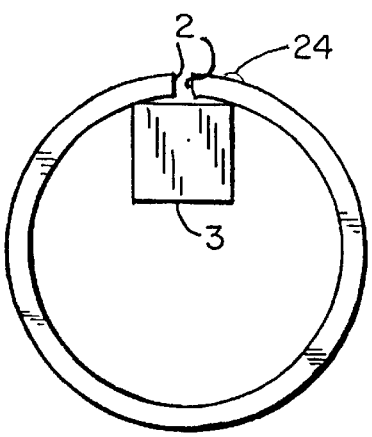
FIG. 4

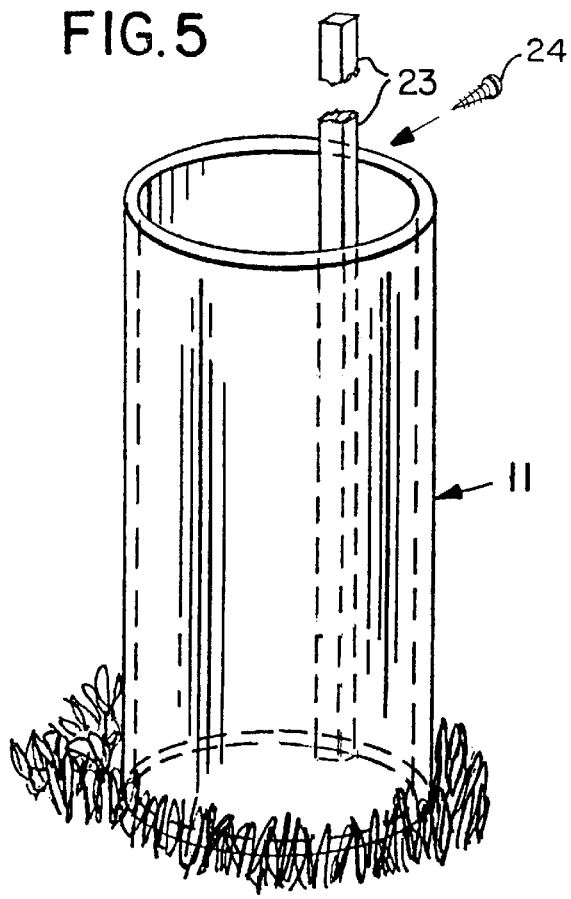
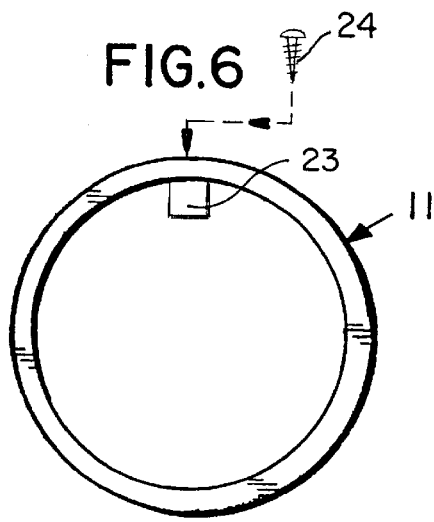
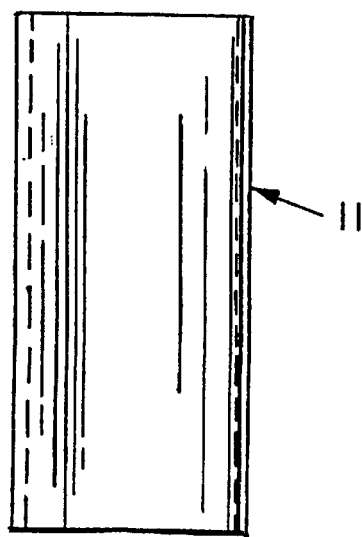

METHOD OF DETERRING CLIMBING ANIMALS FROM ACCESSING ELEVATED BIRD FEEDERS, NESTING BOXES AND PLANTS

CROSS-REFERENCE TO RELATED APPLICATIONS

This application is a continuation-in-part of application Ser. No. 09/067,884, filed Apr. 28, 1998, now U.S. Pat. No. 6,024,048 which application is not abandoned.

BACKGROUND OF THE INVENTION

1. Field of the Invention

There exists a need to guard against animals, such as raccoons or squirrels, that are able to climb wooden, metal, and plastic poles to gain access to bird feeders, nesting boxes and the roots, leaves, flowers and seeds of elevated garden plants. This invention therefore relates to a method and device, which create a barrier to such arboreal animals and thus prevent them from traveling to structures atop poles that are to be protected.

2. Description of the Prior Art

The need to prevent animals from climbing is well known and has been dealt with in an array of fashions. Chester sought to squirrel-proof a pole in his U.S. Pat. No. 4,031,856 by attaching and elongated collar that moves up and down vertically about a pole by means of a counterweight that is provided within the pole. This serves to have the clinging squirrel drop vertically along with the collar by the principle of gravity. While this mechanical system may serve that purpose, it relies on a complicated system of ropes, pulleys, and a sliding counterweight that is vulnerable to snags and wear.

Fisher proposes a conical shaped barrier in his U.S. Pat. No. 4,389,975 that affixes to the underside of a bird feeder. While the barrier may be protective, animals are still able to climb up the pole somewhat. And finally, Danca in his U.S. Pat. No. 5,394,641 demonstrates a system of telescoping casings dangling from suspension chains. This concept relies on a wobbling clanging to achieve its end.

U.S. Pat. No. 4,986,219 of Harris is concerned with providing a generally wide funnel shaped horizontally extending barrier interrupting a squirrel's path up a bird feeder pole.

However, Harris '219 is unsatisfactory since it does not teach a longitudinally extending sleeve having a bird feeder atop at a sufficient height to prevent a squirrel from jumping up from the ground to the level of the bird feeder, nor does Harris disclose a free standing longitudinally extending sleeve having a diameter which prevents a squirrel from grasping the pole with its prehensile paws and pectoralis muscles.

U.S. Pat. No. 5,291,855 of Laverty describes a bird feeder atop a pole, wherein the bottom of the bird feeder has a wide tubular skirt extending around the upper portion of the pole and down from the bottom of the feeder. However Laverty '855 does not teach a free standing hollow, longitudinally extending body extending up from the ground, as in the present invention.

In addition, the skirt of Laverty '855 has a complicated attachment mechanism to suspend it down from the bottom of the bird feeder above. While Laverty '855 states that the skirt is spaced apart from the pole a sufficient distance so that the squirrel cannot reach around the skirt, it does not define the preferable minimal width, which in the present invention is at least four inches in diameter. Therefore, the squirrel deterrent of the present invention can be made with a sleeve of as little as four inches in diameter.

Furthermore, Laverty '855 does not address a minimum height required to prevent a squirrel from avoiding the pole altogether and merely jumping up from the ground to the bird feeder. In contrast, the present invention recites a method of providing a pole sleeve with a minimum height of five feet to prevent the squirrel from leaping up to the level of the bird feeder.

Of the other patents U.S. Pat. No. 5,285,748 of Weldin describe a cylindrical sleeve which is narrow enough for a squirrel to grip, but which are suspended by springs, so that the weight of the squirrel will abruptly bring the sleeve down, thus startling the squirrel away.

Furthermore, U.S. Pat. No. 5,782,041 of Filipescu describes a barbed sleeve that encircles part of a column partially up to the column. However, the Filipescu '041 reference actually does not teach the use of a free standing, non rotatable longitudinally extending sleeve enclosing a bird feeder pole, wherein the pole is made of a pliable, compressible sheet which has a recoil force when gripped by the paws of an animal. Filipescu '041 is concerned with providing a generally wide barbed horizontally extending barrier interrupting a human's climbing path up a column.

However, Filipescu '041 is unsatisfactory with respect to climbing animal deterrence, since it does not teach a free standing, non rotatable longitudinally extending sleeve attached to a bird feeder pole to prevent a squirrel from jumping up from the ground to the level of the bird feeder, nor does Filipescu '041 disclose a free standing, non rotatable longitudinally extending sleeve having a flexible, pliable body which prevents an arboreal animal from firmly grasping the sleeve with its paws, when the flexible sleeve is pressed inward and springs outward upon the exterior of compressive gripping force from an arboreal animal.

U.S. Pat. No. 5,581,935 of Anderson describes a freely rotatable sleeve that is a cattle deterrent. The sleeve is freely rotatable and is not attached to a pole, nor is it freestanding and attached to the ground at its bottom. In fact, in Anderson '935, it is freely rotatable and unattached.

Other cylindrical plant protectors enclosing around a non-elevated plant include U.S. Pat. Nos. 2,062,410 of Garcia, 3,218,759 of Barrons, 5,687,505 of Haufler, and 5,375,368 and 5,692,337, both of Motz, Jr.

Furthermore, U.S. Pat. Nos. 5,195,460 of Loken and 4,765,277 of Bailey describe pole-mounted bird feeders in general.

However, the prior art patents do not describe a method of deterring climbing animals from accessing elevated bird feeders, nesting boxes and plants by elevating the object being protected atop a sleeve of sufficient height and diameter to prevent the prehensile paws and pectoralis muscles of a climbing animal such as a raccoon or a squirrel from maintaining a climbing grip upon the sleeve.

OBJECTS OF THE INVENTION

It is therefore an object of this invention to provide a method and a device, which deter animals such as raccoons or squirrels from climbing a pole and gaining access to a bird nest box or feeder atop the pole.

It is a further object to provide such a device that is of a singular structure of simple esthetic design.

It is yet another object to improve over the disadvantages of the prior art.

SUMMARY OF THE INVENTION

In keeping with these objects and others which may become apparent, the present invention relates to a method of deterring animals such as raccoons or squirrels from climbing up a pole and gaining access to a bird nest box or feeder on top of the pole, by providing a sleeve of sufficient height and diameter to deter climbing.

BRIEF DESCRIPTION OF THE DRAWINGS

In conjunction with the detailed description which follows reference is made to the drawings wherein:

FIG. 1 is a top view of the device used in the method of the present invention, as it would overlap itself;

FIG. 2 is a perspective view of the device as in FIG. 1;

FIG. 3 is a side view of the device, as in FIG. 1, as it would sit upon the ground affixed to a post;

FIG. 4 is a top view of the device, as in FIG. 1, as it would about a post;

FIG. 5 is a perspective view for another embodiment for a seamless pole sleeve;

FIG. 6 is a top plan view thereof;

FIG. 7 is a side elevational view thereof; and,

DETAILED DESCRIPTION OF THE INVENTION

Figure 8:
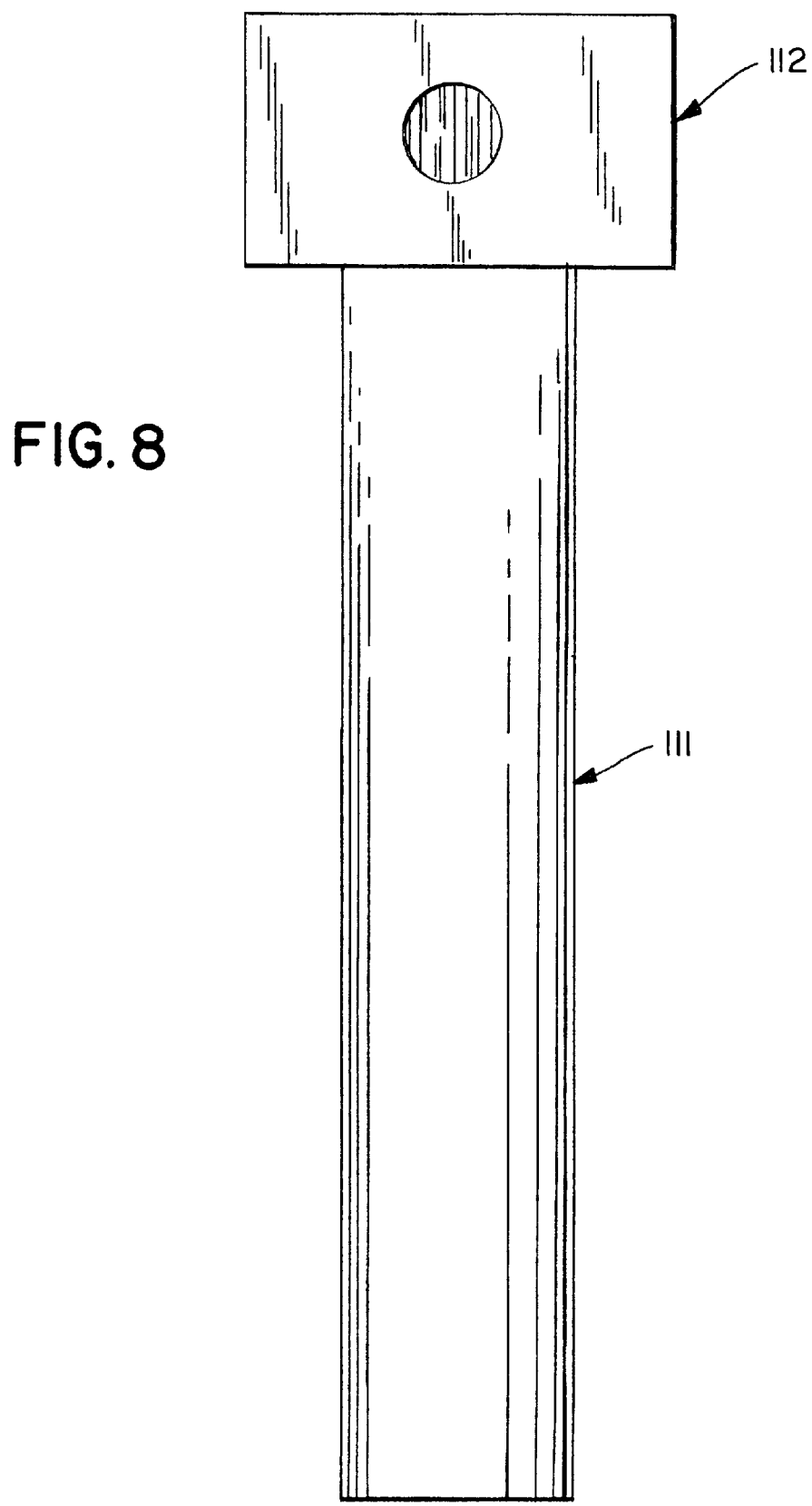
FIG. 8 is a side elevational view of an alternate embodiment for a pole sleeve directly supporting a bird nesting box, bird feeder or elevated plant holder thereupon.

In one embodiment, this patent application concerns itself with a method using device 1, as depicted in FIG. 1, that is formed by a flexible sheet that is rolled into a cylindrical shape. The internal stress that is attained from the bending into position becomes an integral force looking to effect recoil of the material back into a sheet. This potential force comes into play when the round cylinder is subject to additional force by external compression. When the device is gripped and pressed the internal forces built into the cylinder react by springing the cylinder back into position thus dislodging any contender such as a climbing animal.

This device 1 may be placed over and secured to an existing pole or post 3 as depicted in FIG. 3. The ends 2 of the material may be overlapped and joined as in FIG. 2 or may merely approximate on another as in FIG. 4 when being affixed to a pole or post 3.

The composition of the material in FIG. 1 is such that it is pliable and permits bending into a round cylindrical shape and retains "memory" whereby it is looking to return to its original pre-formed position. The material is of sufficient strength to provide ample deflective recoil to the animal selected to be repelled.

FIG. 5 shows another embodiment for a smooth, seamless pole sleeve 11 attached to pole sleeve.

FIGS. 6 and 7 show top and elevational views of pole sleeve 11. The surface of pole sleeve 11 is preferably smooth, such as obtained with a polyvinyl chloride (PVC) pipe, or like materials.

Unlike the cylindrical plant protectors of the prior art of Garcia '410, Barrow '759, Haufler '505, Motz, Jr. '337 and Motz, Jr. as well as the rotatable cattle rubbing deterrent of Anderson '935, which do not directly contact the stem or trunk of the plant being protected, in the preferable embodiment of the present invention, the pole sleeve 11 is attached by one or more fasteners 24, such as screws, to post 23 supporting the bird feeder, nesting box or elevated planter. Screws 24 are shown in the exploded view of FIGS. 5 and 6 as being insertable into posts 23 in the direction of the arrows indicated.

In an alternate, non-preferred embodiment (not shown), the sleeve 11 and post 23 do not touch, but they must be independently anchored free standing with the ground.

In a further alternate embodiment shown in FIG. 8, pole sleeve 111 is a free standing, non-rotatable, longitudinally extending body directly supporting bird feeder 112 or other structure such as bird nesting box or elevated plant holder thereupon.

The respective exterior surfaces of pole sleeve 11 shown in FIGS. 5–7 and of pole sleeve 111 shown in FIG. 8 are smooth enough and the respective diameters are wide enough that an animal cannot exert pressure with its prehensile paws and pectoralis muscles to maneuver up its surface. Moreover the predetermined heights of pole sleeve 11 or 111 exceed the jumping ability of a typical climbing animal such as a raccoon or a squirrel.

For example, controlled biological field-tests conducted by the Applicant over four months duration compared the ability of a statistically significant number of squirrels to climb poles of various widths and heights. It was determined that once a minimum diameter of four inches was presented on bird feeder poles, the squirrels experienced difficulty in climbing and could not ascend the poles. It was also determined that squirrels were unable to jump up to respective top edges of various bird feeder poles having a minimum height of at least five feet.

It is further noted that other modifications may be made to the present invention without departing from the scope of the invention, as noted in the appended claims.

I claim:

1. A method of deterring climbing arboreal animals, including at least one of raccoons, squirrels and opossum, from reaching a bird feeder, nesting box or elevated plant holder, supported atop a post set within the ground; comprising the steps of:

providing a free standing, non-rotatable, hollow, longitudinally extending body and inserting the post supporting said bird feeder, nesting box or elevated plant holder conjunctionally therein;

placing said freestanding, non-rotatable, hollow, longitudinally extending body to extend up from the ground, providing a smooth surface to said free standing, non-rotatable, hollow, longitudinally extending body, whereupon the arboreal animal will slide down said free standing, non-rotatable hollow, longitudinally extending body to a position where the arboreal animal is out of a jumping range to reach said bird feeder, nesting box or elevated plant holder;

providing said freestanding, non-rotatable, hollow, longitudinally extending body with a sufficient width and height to prevent the prehensile paws and pectoralis muscles of the animal from grasping said body;

wherein said free standing, non-rotatable hollow longitudinally extending body has a width of at least four inches in diameter and a height of at least five feet above the ground.

2. The method of deterring arboreal animals as in claim 1, wherein said free standing, non-rotatable hollow longitudinally extending body is attached to said post supporting said bird feeder, nesting box or elevated plant holder.

3. The method of deterring arboreal animals as in claim 2, wherein said freestanding non-rotatable hollow longitudinally extending body is cylindrical.

4. The method of deterring arboreal animals as in claim 3, wherein said free standing, non-rotatable hollow longitudinally extending body is seamless.

5. A method of deterring climbing arboreal animals, including at least one of raccoons, squirrels and opossum, from reaching a bird feeder, nesting box or elevated plant holder, supported atop a post set within the ground; comprising the steps of:

provinding a free standing, non-rotatable, hollow, longitudinally extending body and inserting the post supporting said bird feeder, nesting box or elevated plant holder conjunctionally therein;

placing said freestanding, non-rotatable, hollow, longitudinally extending body to extend up from the ground, providing a smooth surface to said free standing, non-rotatable, hollow, longitudinally extending body, whereupon the arboreal animal will slide down said free standing, non-rotatable hollow, longitudinally extending body to a position where the arboreal animal is out of a jumping range to reach said bird feeder, nesting box or elevated plant holder;

attaching said free standing, non-rotatable hollow, longitudinally extending body to said post supporting said bird feeder, nesting box or elevated plant holder; and, providing said freestanding, non-rotatable, hollow, longitudinally extending body with a sufficient width and height to prevent the prehensile paws and pectoralis muscles of the animal from grasping said body;

wherein said free standing, non-rotatable hollow longitudinally extending body has a width of at least four inches in diameter and a height of at least five feet above the ground.

6. The method of deterring arboreal animals as in claim 5, wherein said freestanding non-rotatable hollow longitudinally extending body is cylindrical.

7. The method of deterring arboreal animals as in claim 5, wherein said free standing, non-rotatable hollow longitudinally extending body is seamless.

* * * * *